Aug. 12, 1969   L. L. SAUNDERS ET AL   3,460,993
RELEASE MECHANISM FOR AUTOMATIC ACTIVATOR
Filed Oct. 23, 1967

INVENTORS
LAWRENCE L. SAUNDERS
JOHN A. SIBILIA
BY
Fraser and Bogucki
ATTORNEYS

United States Patent Office 3,460,993
Patented Aug. 12, 1969

1

3,460,993
RELEASE MECHANISM FOR AUTOMATIC
ACTIVATOR
Lawrence L. Saunders and John A. Sibilia, Denver, Colo., assignors to Whittaker Corporation, Los Angeles, Calif., a corporation of California
Filed Oct. 23, 1967, Ser. No. 677,382
Int. Cl. H01m 17/00
U.S. Cl. 136—90    8 Claims

ABSTRACT OF THE DISCLOSURE

The storage container in which activator fluid is stored has an outlet tube which is sealed at its outer end by a frangible diaphragm and contains a piston held in place at its inner end by a yieldable detent to maintain a liquid seal between the fluid stored in the storage container and the diaphragm. When activating pressure is applied to the activator fluid in the container, this pressure forces the piston free of the detent to move along the tube toward the diaphragm. Fluid pressure behind the moving piston forces it through the diaphragm, breaking it and opening the outlet tube, thus permitting the discharge of the activator fluid from the container to the battery cell.

BACKGROUND OF THE INVENTION

This invention relates to the field of automatically activated electrical storage batteries and the like, and more particularly to automatic systems having an improved mechanism for automatically releasing activator fluid from a storage container to the battery upon application of activating pressure.

Wet cell batteries generally tend to deteriorate prior to use, once the electrolyte or other activator fluid is present within the cells. Such batteries are best preserved over extensive periods prior to use by maintaining the cells in a sealed condition without activator fluid, which is added only shortly prior to use. For situations where the battery may be inaccessible for manual filling, such as in spacecraft and missiles, systems have been devised for automatically adding the fluid by remote control. Generally, such systems respond to the receipt of an electrical control signal to generate an activating pressure within a storage container to expel activator fluid into the battery cells.

In such systems, the stored activator fluid must be sealed against leakage within the storage container to be released only upon application of the activating pressure. Prior systems have most generally employed pressure sensitive, frangible diaphragm arrangements that seal the container outlet before activation and are designed to break under the force of the activating pressure. In other cases, various electromechanical devices and electroexplosive mechanical devices have been employed to puncture sealing diaphragms. With the pressure sensitive diaphragm arrangements, the diaphragm must be thick enough to withstand any fluid pressures resulting prior to activation, but thin enough to break upon application of an activating pressure. However, diaphragms thin enough to be broken by reasonable activating pressures are usually sensitive to resonant frequencies within the range of those produced in the normal operating environment. The resulting structural fatigue over an extended period prior to activation can produce diaphragm failure, thus causing premature battery activation. On the other hand, with electromechanical and electroexplosive mechanical puncturing devices, thicker diaphragms that are more resistant to structural fatigue can be used, but proper timing sequences must be established to coordinate the battery activation and puncture. However, elaborate timing mechanisms introduce a source of possible malfunction that must be taken into account in meeting reliability standards for the system.

SUMMARY

The activator system of the invention employs an elongated cylindrical outlet tube from the activator fluid storage container which is sealed at its outer end by a frangible diaphragm and at its inner end by a movable piston. The piston is held in place at the inner end of the tube by a yieldable detent that engages the outer periphery of the piston to apply a light restraining force on the outer walls of the piston to counteract any fluid pressures that might exist within the container prior to activation. In the preferred embodiment, the detent means consist of a slight constriction of the interior diameter of the outlet tube which fits into a radial groove on the piston. An O-ring on the piston provides a suitable seal for isolating the diaphragm ahead of the piston from the fluid within the container.

When an activating pressure is applied to the stored fluid, such as by electrical ignition of a pyrotechnic gas generator within the container, the increased pressure exerts sufficient force on the rear of the piston to overcome the restraining force of the detent, so that the piston moves past the detent towards the diaphragm. As the front of the moving piston engages the diaphragm breaking it to allow passage of the piston through the outer end to release the activator fluid behind to flow into the battery, a screen trap encloses the outer end of the outlet tube to catch the piston as it is expelled, along with any diaphragm fragments to prevent their being carried into the connecting conduits or into the battery cells. The outer end of the piston is preferably tapered to insure proper rupture of the diaphragm and easy passage of the piston through it.

DESCRIPTION OF THE PREFERRED EMBODIMENT

Figure 1:
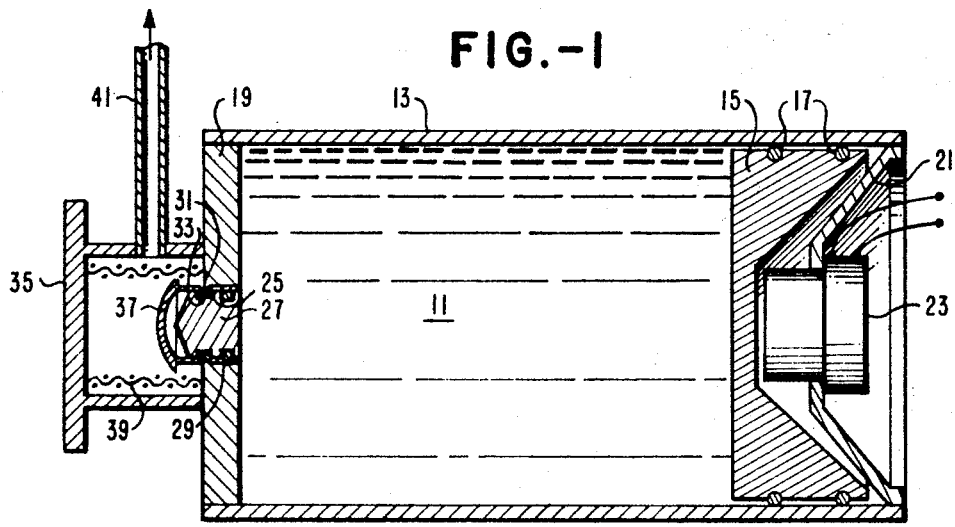
FIG. 1 is a top sectional view showing schematically a preferred embodiment of a battery activator system in accordance with the invention in its unoperated condition prior to activation; and, FIG. 2 is a full top sectional view of the system shown in FIG. 1 in its fully operated condition.

Referring now to FIG. 1, which shows the system prior to activation, the activator fluid 11 is contained within a cylidrical storage container 13 ahead of a large activating piston 15. O-rings 17, disposed in grooves on the activating piston 15, provide a pressure tight seal separating the container volumes adjacent front and back piston surfaces. The cylinder 13 has front and rear closures 19 and 21, respectively, to enclose the cylinder volume. In this embodiment, an electrically actuated gas generator 23, which may be of the pyrotechnic type, is mounted on the rear closure to generate an activating gas for pressurizing the cylinder volume at the rear of the piston.

The release mechanism of this invention consists of an elongated cylindrical outlet tube 25 centrally mounted within an aperture in the front closure 19 to define an outlet passage for the discharge of the activator fluid 11 from the cylinder. A cylindrical piston member 27 is disposed within the outlet tube 25 and is held in place at its inner end by a detent arrangement. A compressible O-ring 29, disposed in a radial groove about the periphery of the piston 27, provides a pressuretight seal between the outer piston surface and the inner surface of the outlet tube 25 to separate the volume behind the piston from that ahead of it. A frangible diaphragm 37 is attached by brazing or other appropriate means to cover the outer end of the outlet tube 25.

As shown, the detent arrangement used for restraining the piston prior to activation consists of a slight radial constriction 31 of the inner diameter of the outlet tube 25 that forms a ridge to engage a mating groove 33 extending around the periphery of the piston 27. The degree of this tube constriction relative to the outer piston diameter is selected to provide a restraining force suitable to the desired level of activating pressure, as will become apparent hereinafter.

The outer end of the outlet tube 25 is enclosed by a sealed outlet fitting 35 which extends at least the length of the piston past the outer end of the outlet tube 25, and has a diameter substantially larger than that of the outlet tube. A conventional frangible diaphragm 37 seals the outer end of the outlet tube 25. The diaphragm 37 generally may have a thickness and strength less than that normally required if it were in direct contact with the fluid 11. A cyclindrical section of relatively fine mesh screen 39 is disposed within the outlet fitting 35 to surround the outer end of the outlet tube 25. The cylindrical screen 39 extends from the front closure 19 to the inner front surface of the outlet fitting 35, thereby completely enclosing the outer end of the outlet tube 25. The screen thus acts as a trap for the piston 27 and solid particles to prevent their entering or interfering with fluid flow through a fill conduit 41 connecting the interior of the outlet fitting 35 to the battery cells (not shown). Of course, all materials used in fabricating the various components should be chemically compatible with the activator fluid.

In operation, the activator fluid storage container 13 is initially filled with the desired volme of activator fluid 11. The piston 27 is initially forced into position within the outlet tube 25 so that the radial ridge 31 engages the mating groove 33. Depending on the flexibility of the materials used in the piston and outlet tube, the radial constriction forming the ridge 31 is sized to exert a restraining force in excess of the maximum forces that would be applied to the piston by the activator fluid 11 as a result of the maximum temperature and pressure changes likely to be encountered during storage. With the piston 27 in position, the O-ring 29 acts as a pressure seal between the activator fluid 11 and the frangible diaphragm 37 at the outer end of the outlet tube 25. In this way, the frangible diaphragm 37 is effectively isolated from stresses resulting from pressure variations within the storage container 13.

When it is desired to activate the battery, an electrical starting signal applied to the gas generator 23 initiates the production of high-pressure gases at the rear of the storage cylinder 13 behind the large activating piston 15 to force it forward. As the internal pressure of the electrolyte 11 increases, the force on the piston member 27 in the outlet tube 25 soon exceeds the restraining force provided by the detent arrangement, at which time the radial ridge 31 disengages from the groove 33 to permit outward movement of the piston member 27. As the piston member 27 travels towards the outer end of the outlet tube 25, it contacts the inner face of the frangible diaphragm 37 so that the force exerted on the rear of the piston member 27 is applied to the diaphragm. A tapered front on the piston member 27 as shown concentrates the entire force on a small area of the diaphragm 37 so that it is easily broken.

Figure 2:
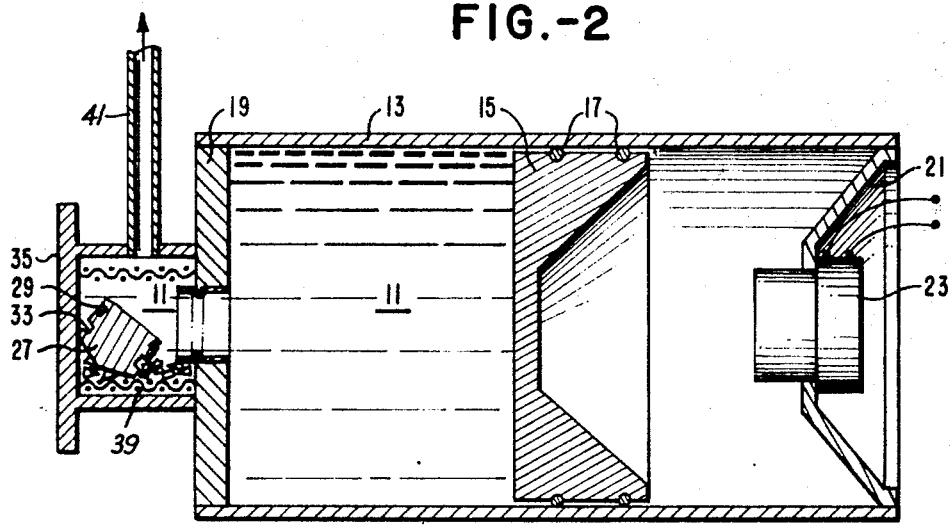

As shown in FIG. 2, the piston member 27 is then forced through the broken diaphragm 37 and out of the outlet tube 25 into the space within the outlet fitting 35, leaving an unobstructed fluid passage through the outlet tube 25 from the interior of the container 13. The activator fluid 11 is then free to flow into the interior of the outlet fitting 35 and then through the screen mesh 39 and the conduit 41 to fill the battery cells. The free piston member 27 and broken fragments of the diaphragm 37 are trapped by the screen 39 to prevent any interference with the free flow of the activator fluid 11 to the battery. The large activating piston 15 then moves forward in the cylinder 13 in response to the force of the high-pressure gases generated behind it to expel the entire volume of activator fluid 11 from the interior of the storage container 13 into the battery cells.

Thus, this arrangement maintains electrolyte fluid in storage over long periods of time without danger of premature release due to the effects of pressure variations on the diaphragm, while permitting quick and efficient release of the activator fluid upon actuation. Similar arrangements may be equally useful in providing for automatic release by remote control of other stored fluids.

While a preferred embodiment has been described and illustrated herein to explain the nature of the invention, it should be understood that the invention is not limited to the details shown herein, but includes any and all modifications, alterations and equivalent arrangements falling within the scope of the appended claims.

What is claimed is:

1. An automatic battery activator for introducing electrolyte to battery cells comprising:
   a storage container for confining the electrolyte prior to release;
   a cylindrical outlet tube defining an elongated electrolyte conduit from said storage container;
   a piston member disposed within said outlet tube to form a pressure seal to prevent the flow of electrolyte from the container through said outlet tube;
   detent means disposed within said outlet tube for restraining the longitudinal movement of said piston member within said outlet tube;
   a frangible diaphragm member for sealing the outer end of said outlet tube; and
   means for pressurizing the electrolyte within said container to overcome the restraining force of said detent means and for moving said piston longitudinally along said outlet tube to engage said diaphragm member, the end of said piston disposed towards said diaphragm being configured to break said diaphragm upon engagement and permit passage of said piston through the outer end of said outlet tube, thereby permitting release of said electrolyte from said container through said outlet tube to fill the battery cells.

2. The automatic battery activator of claim 1 further comprising:
   trap means enclosing the outer end of said outlet tube for permitting the complete emergence of said piston from said outlet tube and for confining said piston and particles of said diaphragm while permitting the free flow of said electrolyte to said battery.

3. The automatic activator of claim 2 wherein:
   said trap means comprises a cylindrical screen enclosing a volume substantially larger than said piston surrounding the outer end of said outlet tube.

4. The automatic battery activator of claim 1 wherein:
   said restraining means constitutes a restriction of the interior diameter of said outlet tube sufficient to establish contact with the outer longitudinal surface of the piston in a predetermined location.

5. An automatic fluid activator system for storing and discharging fluid comprising:
   a storage container for confining a desired quantity of fluid prior to release;
   an outlet tube of substantially constant interior cross-section defining an elongated fluid conduit for the release of said fluid;
   piston means disposed within said outlet tube to form a pressure seal between opposite ends of said outlet tube;
   detent means disposed within said outlet tube for restraining longitudinal movement of said piston means within said outlet tube;

a frangible diaphragm sealing the outer end of said outlet tube; and activating signal responsive means for pressurizing the electrolyte within said storage container to a level sufficient to overcome the restraining force of said detent means, thereby permitting said piston means to move longitudinally along said outlet tube towards said frangible diaphragm, said diaphragm having a configuration to be broken upon contact by said piston means to permit passage of said piston means through the outer end of said outlet tube, thereby permitting release of said electrolyte from said container through said outlet tube.

6. The automatic fluid activator system of claim 5 wherein:

said detent means provides a force for restraining said piston means substantially in excess of maximum forces produced by said fluid on said piston means during storage; and said pressurizing means is capable of generating a force on said piston means substantially in excess of said restraining force.

7. The activator fluid system of claim 6 wherein:

said forward end of the piston has a tapered configuration to limit the initial area of contact prior to breaking of the diaphragm to a relatively small area, whereby the force on said piston means is concentrated in said limited area to break said diaphragm.

8. The fluid activator system of claim 7 further comprising:

trap means enclosing the outer end of said outlet tube for permitting the complete emergence of said piston means from said outlet tube and for confining said piston and particles of said diaphragm after breaking, while permitting the free outward flow of said fluid.

References Cited
UNITED STATES PATENTS

| | | | |
|---|---|---|---|
| 3,036,140 | 5/1962 | Oestermeyer et al. | 136—90 |
| 3,236,697 | 2/1966 | Amiet et al. | 136—90 |

ALLEN B. CURTIS, Primary Examiner

C. F. LEFEVOUR, Assistant Examiner

U.S. Cl. X.R.

136—114; 137—70